United States Patent [19]

Fredrick et al.

[11] Patent Number: 4,873,618

[45] Date of Patent: Oct. 10, 1989

[54] POWER SUPPLY FOR D.C. ARC LAMPS

[75] Inventors: William Fredrick, Valencia; Robert Brent, Saugus; Peter Baldwin, Costa Mesa, all of Calif.

[73] Assignee: Camera Platforms International, Inc., Valencia, Calif.

[21] Appl. No.: 128,149

[22] Filed: Dec. 3, 1987

Related U.S. Application Data

[63] Continuation-in-part of Ser. No. 39,044, Apr. 16, 1987, and a continuation-in-part of Ser. No. 53,271, May 21, 1987, and a continuation-in-part of Ser. No. 85,015, Aug. 7, 1987.

[51] Int. Cl.[4] .......... H02M 3/335

[52] U.S. Cl. .......... 363/17; 363/65; 363/98; 363/124; 363/132; 323/266; 315/DIG. 7

[58] Field of Search .......... 363/17, 55–56, 363/65, 71–72, 89, 97–98, 131, 132; 323/266, 224; 315/DIG. 5, DIG. 7

[56] References Cited

U.S. PATENT DOCUMENTS 3,641,422 2/1972 Farnsworth et al. .......... 323/224
3,737,755 6/1973 Calkin et al. .......... 363/17
4,257,090 3/1981 Kroger et al. .......... 363/65
4,481,460 11/1984 Kroning et al. .......... 323/266
4,663,699 5/1987 Wilkinson .......... 363/98

OTHER PUBLICATIONS

Jon D. Paul, "The Electronic Ballast", PCI '81 Proceedings, pp. 467–484.
Jon D. Paul, "Reliability Aspects of Electronic Ballasts", Paul Laboratories, San Francisco, Calif., pp. 1–11.

*Primary Examiner*—Peter S. Wong
*Attorney, Agent, or Firm*—Ladas & Parry

[57] ABSTRACT

A power supply for an arc lamp. It includes a DC to DC converter which has an input, an output, and a circuit for increasing the voltage received at the input and for supplying the increased voltage to its output. A current sensing circuit is provided for controlling the amount of current delivered to the output. The power supply is capable of quickly igniting and re-igniting arc lamps, is relatively inexpensive to manufacture and is relatively light in weight. The power supply can accept either an AC or DC source over a wide voltage range and increases or decreases the input voltage compared to the output voltage.

21 Claims, 14 Drawing Sheets

POWER SUPPLY FOR D.C. ARC LAMPS

CROSS REFERENCE TO RELATED APPLICATIONS

This application is a Continuation-In-Part of copending application Ser. No. 039,044, filed Apr. 16, 1987; and of copending application Ser. No. 053,271, filed May 21, 1987; and of copending application Ser. No. 085,015 filed Aug. 7, 1987. The disclosures of the three aforementioned patent applications are hereby incorporated herein by reference.

BACKGROUND OF THE INVENTION

This invention provides a current controlled AC/DC power supply for D.C. arc lamps, such as HMI lamps, mercury vapor lamps, sodium vapor lamps, and the like. Such lamps are used in theatrical productions, on cinematographic stages, for the production of TV shows, in industrial applications, for lighting sporting events and for street and outdoor lighting in general, to name only a few applications. When used in cinematographic, theatrical, and TV applications and sometimes when used in industrial or sporting applications, the lamp selected must have a correct light spectrum characteristic (or color temperature), which often means that it must have the same light spectrum (color temperature) as the sun so that colors appear natural. In such cases, the current supplied by the power supply to the lamp must be carefully controlled in order to provide precise regulation of lamp color temperature.

The prior art power supplies have a number of drawbacks. They tend to be bulky, expensive and slow to ignite or re-ignite the lamp being powered. In the case of power supplies used for theatrical work, cinematographic work or in a TV studio, the power supplies should be preferably portable (and, in the case of the prior art, they were, at best, semi-portable because the power supplies were quite heavy), they should generate flicker free light and need to be able to ignite and re-ignite the lamp quickly. In industrial applications, the ability to re-ignite a lamp quickly can also be very important. In an effort to save energy costs, many factories have switched from traditional lamps to arc lamps due to their greater energy efficiency. Power outages can occasionally occur, however, and since the power supplies used to power such lamps have required a comparatively long time to restart or re-ignite the lamps, the factory can be without light for a considerable length of time. If it takes more than a few minutes to restart the lamps, then the loss of production at the factory can outweigh the savings from using such lamps.

Traditionally, HMI lamps and other similar lamp types were not operated on DC (Direct Current) because DC can cause erosion of the electrodes resulting in rapid destruction of the bulb. If the lamp is powered by a sinusoidal AC (Alternating Current) waveform, the erosion problem is overcome, but the resulting light emitted varies sinusoidally resulting in the phenomenon known as flicker. Those skilled in the art realize that flicker is undesirable, especially in cinematographic applications. If a square waveform is utilized to power the lamp then both the erosion problem and the flicker problem are overcome, but at the expense of an increase in complexity of the power supply. With proper design, a D.C. lamp can be erosion resistant and therefore have an adequately long life.

Readily available power sources supply sinusoidal AC. For example, the 120 volt 60 Hertz power available in American homes and industry is sinusoidal AC. On cinematographic stages DC power has traditionally been available. Preferably, a power supply for arc lamps should be able to be powered from either AC or DC sources of wide voltage ranges. In particular, the power supply should be functional even when the input voltage is less than the voltage required to ignite and run the arc lamp. Moreover, the power supply should be light weight, cost effective to manufacture and yet provide sufficient power resources to quickly ignite or re-ignite the arc lamp.

BRIEF DESCRIPTION OF THE INVENTION

Briefly, and in general terms, the instant invention provides a power supply for a D.C. arc lamp, which has a DC to DC converter with an input and output. The DC to DC converter is capable of increasing the voltage received at its input and supplies the increased voltage to its output. A current sensing circuit is provided for controlling the amount of current delivered to the output.

The converter preferably includes a transformer driven by a plurality of transistors, preferably MOSFETs. Bridge configurations and push/pull arrangements are disclosed. The transformer output is then rectified and filtered to create a DC source for the lamp. The transistors of the converter are turned on and off by a pulse width modulated control circuit in order to vary the DC output power in accordance with lamp requirements. The lamp current is sensed and supplied to an amplifier which then supplies a signal to the pulse width modulated control circuit forming a control loop to keep the lamp voltage and current essentially fixed. This allows the lamp color temperature to be accurately regulated and the lamp to be operated without varying intensity level regardless of input power variations. Further, a wide range of either AC or DC power sources may be utilized as the original power input for the device. The output voltage can be either higher or lower than the source voltage to the power supply. The power supply, even when sized to power a 4000 watt arc lamp, can be easily carried by one person.

DESCRIPTION OF THE DRAWING

The novel features which are believed to be characteristic of the invention are set forth in the appended claims. The invention itself, however, both as to its construction and its method of operation and use, together with the objects and features thereof, will be best understood from the following detailed description of a number of embodiments, when read in conjunction with the accompanying drawing, wherein:

DETAILED DESCRIPTION

Figure 1:
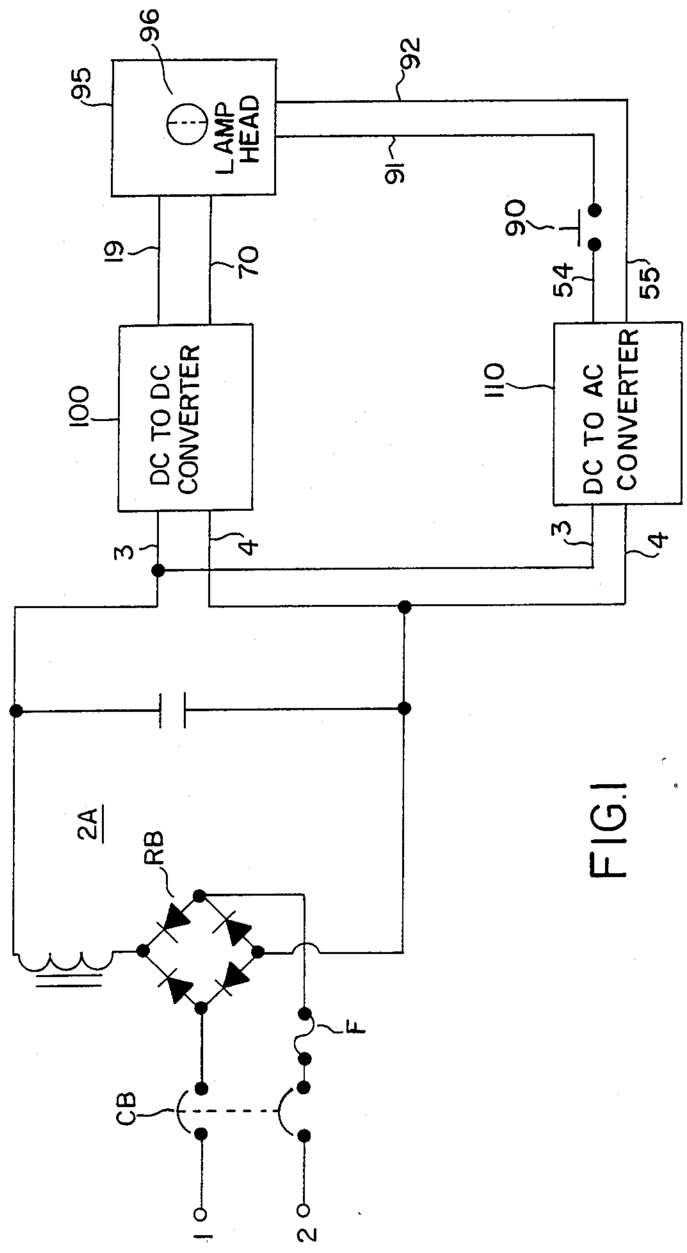
FIG. 1 is a block diagram a power supply for a D.C. arc lamp.

1. The Block Diagram of FIG. 1

Incoming AC or DC is applied via Inputs 1 & 2, a circuit breaker CB, and a fuse F to a full wave diode rectifying bridge RB. The polarity of incoming DC applied at Inputs 1 & 2 is not particularly important since rectifying bridge 1 will correct the polarity, if required. Rectifying bridge converts the incoming AC to DC (if the input is AC) or merely passes incoming DC. The DC output from the bridge 1 appears at a bus 3, 4, and is smoothed, if necessary, by a filter 2A comprising a choke inductor and a capacitor.

The use of the rectifying bridge permits the power supply to be connected to either an AC source or to a DC source. If the power supply is only to be used with DC sources, then, of course, those skilled in the art will appreciate that the rectifying bridge can be eliminated, but then it will be important to connect the incoming DC source with correct polarity to bus 3,4.

The DC appearing on bus 3,4 is thereafter stepped up in voltage by a DC to DC converter circuit 100 which, as will be seen, preferably includes a number of MOSFETs (Metal Oxide Silicon Field Effect Transistors) which are selected or sized to carry at least the normal operating current of the largest lamp to which the supply will be connected. The stepped up DC voltage appears at an output bus 19, 20, which is connected to the D.C. arc lamp 96 in lamp head 95.

The DC on bus 3,4 is also applied to the input of a DC to AC converter 110, which preferably takes the form of an "H" bridge. The output 54,55 of the "H" bridge is applied through ignitor switch 90 to the ignitor input on lamp head 95. Switch 90 is closed when it is desired to initially ignite the lamp 96 in head 95 or when it is necessary to re-ignite the lamp 96.

As will be seen, the "H" bridge also preferably includes a number of MOSFET transistors and these transistors need to be sized so as to carry the ignition current which flows on bus 91, 92 when switch 90 is closed. Generally speaking, the MOSFET's in the DC to DC convertor 100 will carry more current than the MOSFET's in the DC to AC converter 110.

2. Embodiments of the DC to DC Converter

Figure 1A:
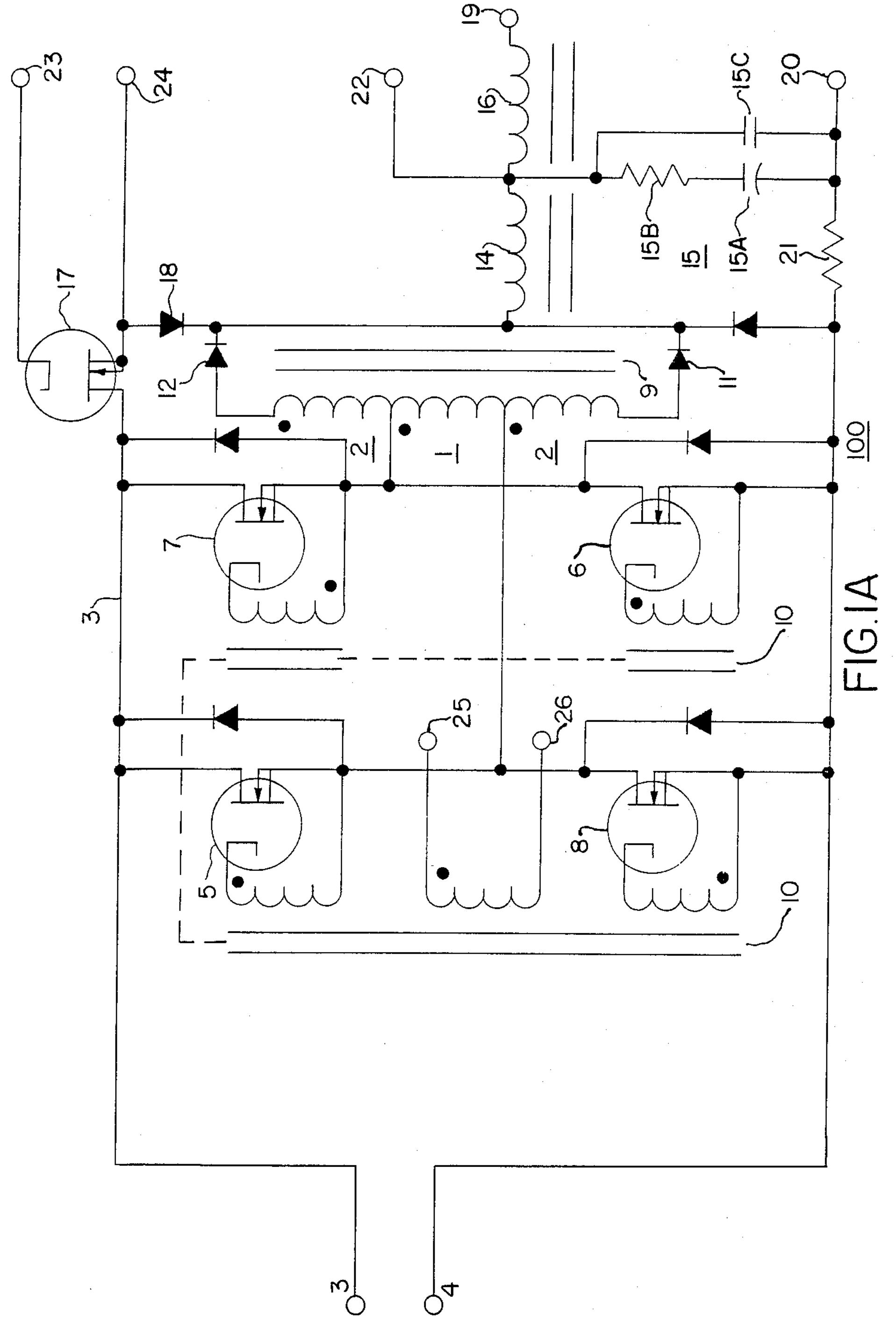
FIG. 1A is a circuit diagram of a first embodiment of a DC to DC converter device.

FIG. 1A is a schematic diagram of a first embodiment of a DC to DC converter 100. The DC on bus 3,4 is first converted to AC by an oscillator circuit which includes MOSFETs 5-8. The AC voltage is stepped up by an autotransformer 9 and thereafter reconverted back to DC, which appears at an output bus 19, 20.

The four MOSFET switches 5, 6, 7 and 8 of the oscillator circuit are arranged in a bridge configuration in which only one pair of MOSFETs are gated on and therefore conducting at any given time (that is, at most, only one pair of MOSFETs, either MOSFETs 5 and 6 or 7 and 8 are conducting at any given time) causing current to alternate in the winding of an autotransformer 9. The conduction by the MOSFET switches 5-8 is pulse width modulated at a high frequency (preferably greater than 15 KHz so as to be inaudible and more preferably about 30 KHz) by controlling the gates of MOSFET switches 5-8 by a gate drive transformer 10 which is driven a control circuit which will be subsequently described with reference to FIG. 2A. At 30 KHz, gate drive transformer 10 is a convenient means of controlling the gates of MOSFETs 5-8 with the pulse width modulated signal available at nodes 25 and 26. Those skilled in the art will appreciate that other means of driving the gates can be used, including using optologic devices in a manner similar to that used (and subsequently described) with respect to MOSFETs 50-53 in FIG. 3.

Autotransformer 9 steps up the voltage received at its input and the resulting alternating current flows through and is rectified by diodes 11 and 12 connected at the output of autotransformer 9. A filter, in this case a "T" filter comprising an inductor 14, capacitor arrangement 15 and inductor 16, filters and smooths the DC generated by diodes 11 and 12.

Capacitor arrangement 15 is preferably a 2000 mfd 300 V DC capacitor, while inductor 14 is preferably a 300 MicroHenry choke and inductor 16 is preferably a 100 MicroHenry choke. The size of the capacitor is preferably relatively large while the size of the inductors is preferably relatively small. The reason for this relationship will be addressed subsequently.

During the time MOSFETs 5-8 are not conducting, current can be supplied to the filter 14, 15, 16 through an additional MOSFET 17 and diode 18. DC flows from output 19 of the DC to DC converter 100 to the lamp, which will be subsequently described with reference to FIG. 3. The DC returns via return 20 and then flows through a current sensing resistor 21 back to bus 4. The voltage drop generated across the current sensing resistor 21 is applied to the gate drive control circuit of FIG. 2A and, as will be seen, is used to control the pulse width modulation applied to the MOSFET gates 5-8 through transformer 10. Since the voltage drop across sensing resistor 21 is proportional to the current being supplied by the power supply, the pulse width modulation of MOSFETs 5-8 by the gate drive circuitry of FIG. 2A effectively controls the amount of current delivered by the power supply to the lamp. As previously mentioned, controlling the current to the lamp means that its color temperature is being controlled.

MOSFET switch 17 is gated on when the output voltage of the DC to DC converter 100 is higher than its input voltage and off when the output voltage is less than its input voltage. Current is pumped to the output of the converter 100 when MOSFET switch 17 is on (i.e. when the output voltage is higher than the input voltage) during portions of the flyback of autotransformer 9 thereby increasing the efficiency of the circuit. Thus, MOSFET switch 17 reduces the amount of power required to be converted by the bridge MOSFETS 5, 6, 7 and 8 during normal running of the lamp when gated on or allows operation of the lamp at reduced voltage levels during warm up when gated off.

The input voltage to the DC to DC converter 100 can be as low as 90 volts and it will still function properly. Lower voltages can be accommodated, if desired, by changing the winding ratio of autotransformer 9 to yield a higher voltage step up. The winding ratio of autotransformer is preferably 2:1:2, but these ratios can, of course, be varied. The maximum voltage which can be accommodated is determined by the ability of the various components to withstand higher voltages. Either AC or DC can be applied to the Inputs 1 and 2 (FIG. 1). Thus, the power supply is capable of using either AC or DC in a wide range of possible voltages as its source of power.

FIGS. 1B through 1G are schematic diagrams of additional embodiments of a DC to DC converter 100. Those skilled in the art will appreciate that the embodiments of FIGS. 1B through 1G bear certain similarities to the embodiment of FIG. 1A and therefore components which perform essentially the same function as heretofore described bear the same identification numerals. Components whose functions have changed somewhat are shown with a prime after their identification number and these components will be described in the following description.

Figure 1B:
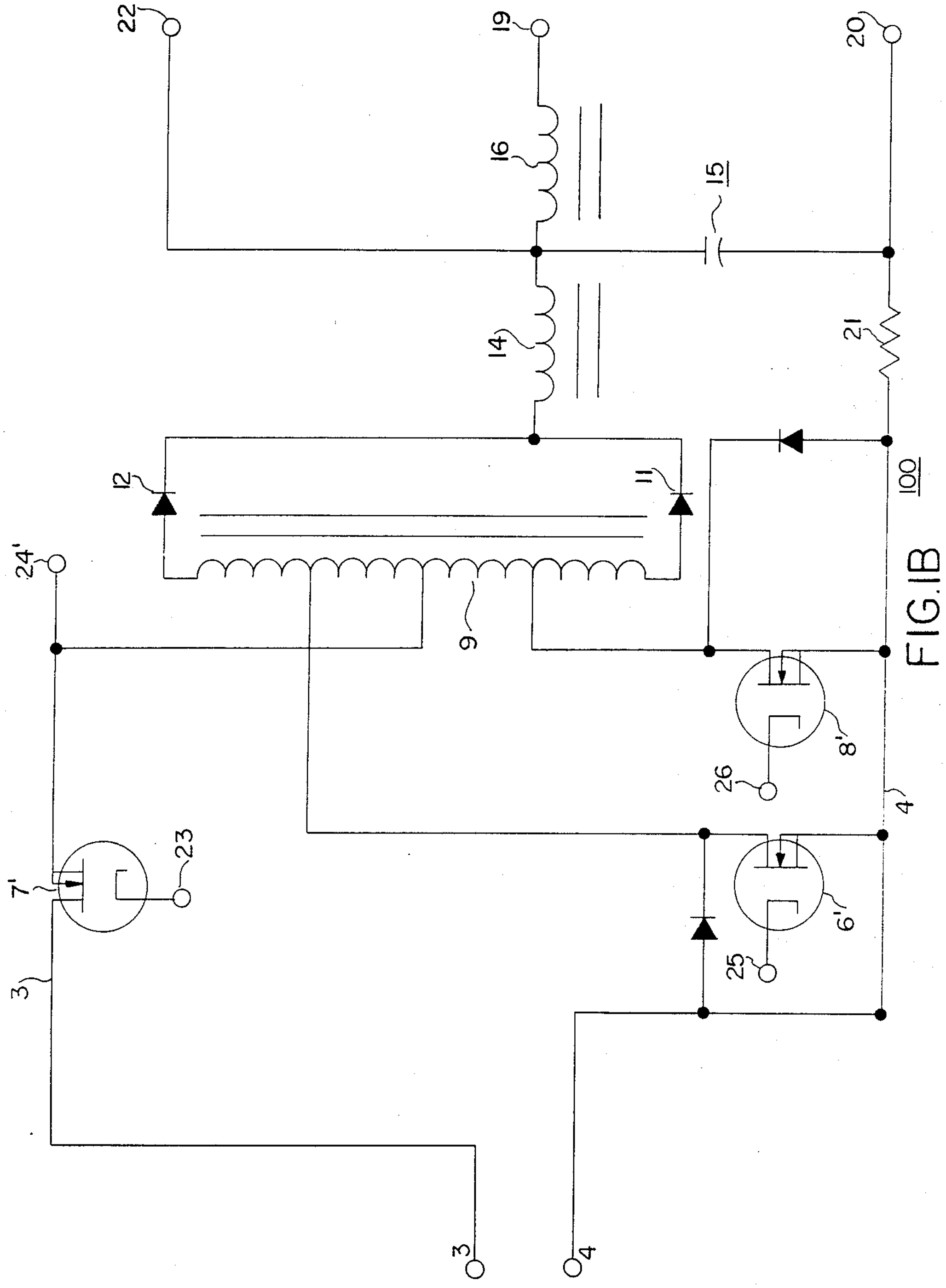
FIG. 1B is a circuit diagram of a second embodiment of a DC to DC converter device.

Turning to FIG. 1B, there is shown a circuit schematic of a second embodiment of a DC to DC converter 100. In this second embodiment, MOSFETS 6', 7' and 8' are arranged in a push/pull arrangement with autotransformer 9. In operation, MOSFETs 6' and 8' are alternatively switched on to drive current through the autotransformer 9 onto the load. MOSFET 7' is on continuously when the unit is in normal operation, i.e., the lamp 96 is hot and the output voltage from the power supply is high. When the output voltage must be low, MOSFET 7' is switched on and off at a rate twice that of either MOSFET 6' or MOSFET 8'. That is, the pulse width modulation signal which is used to drive MOSFETs 6' and 8' is also used to drive MOSFET 7' such that MOSFET 7' is on when either MOSFET 6' or 8' is on. By using pulse width modulation control coupled to nodes 23', 25 and 26, the output voltage can be controlled to be lower than that of the input voltage to the power supply.

As in the case with the fifth MOSFET 17 described with reference to FIG. 1A, MOSFET 7' in the embodiment of FIG. 1B is switched on when the output voltage is approximately equal to the input voltage.

In operation, when MOSFET 6' conducts, current flows from MOSFET 7' (which is also conducting) into autotransformer 9 and through MOSFET 6' to the input return bus 3. Current also flows through diode 11 to the lamp. At the end of the duty cycle for MOSFET 6', MOSFET 6' turns off and the current stops flowing through it. However, the load current can still flow through diodes 11 or 12 as required. MOSFET 8' turns on at the next duty cycle period and current is reversed in autotransformer 9 and flows from MOSFET 7' into autotransformer 9 and through MOSFET 8' to the input return. It also flows through diode 12 and to the lamp. The turns ratio of the autotransformer of FIG. 1B is preferably 1:1:1:1, but these ratios can, of course, be varied.

The control circuit for MOSFETs 6', 7' and 8', which will be subsequently described with reference to FIGS. 2A and 2B, senses the current and voltage requirements and adjusts the duty cycles of the MOSFETs accordingly.

Figure 1C:
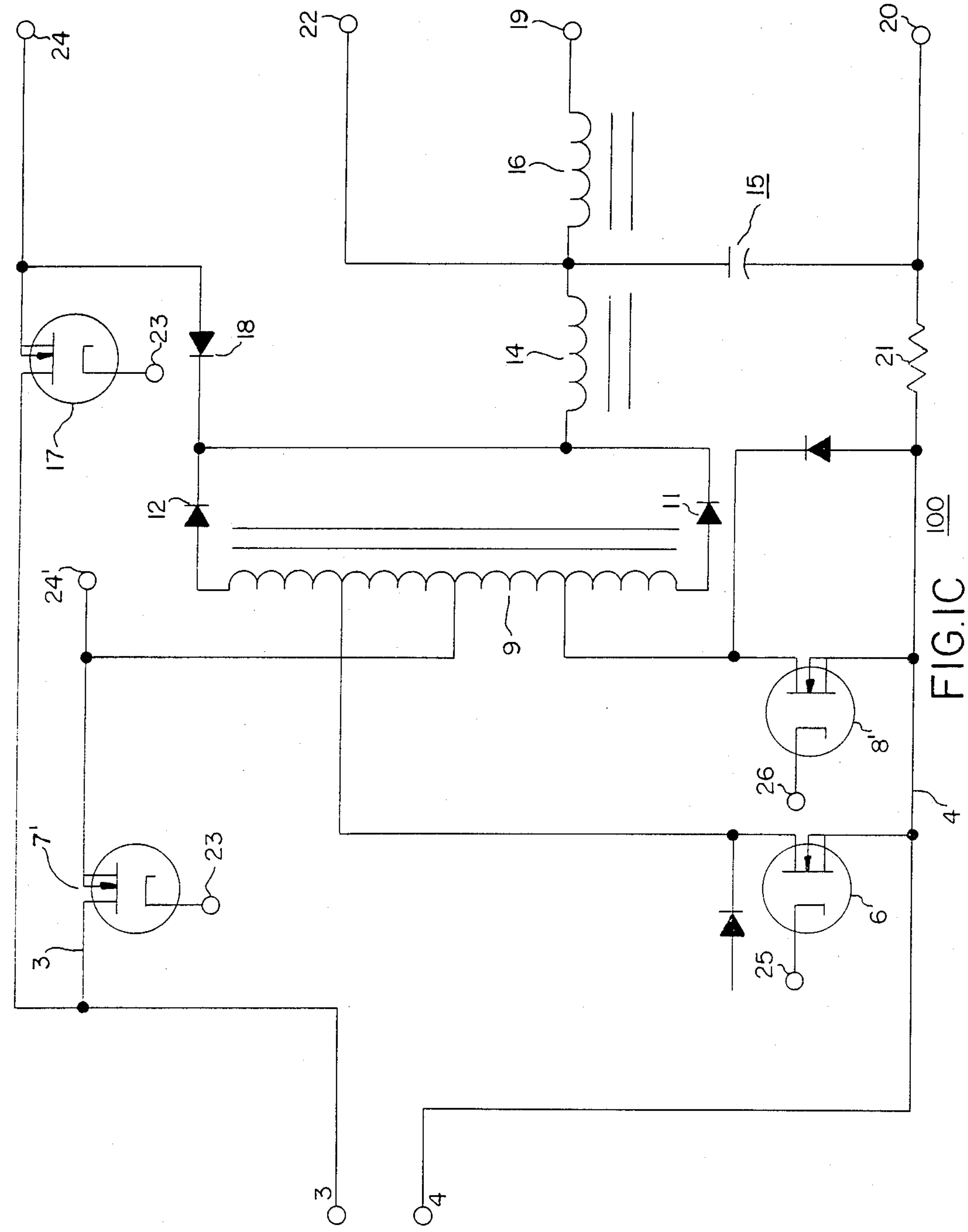
FIG. 1C is a circuit diagram of a third embodiment of a DC to DC converter device.

Turning now to FIG. 1C, this is a circuit diagram of a third embodiment of the DC to DC converter 100. This embodiment is similar to the embodiment of FIGURE 1B, but in this case MOSFET 17 is employed in the same manner as it is in FIG. 1A. Thus, MOSFET 17 is switched on whenever the output voltage of the power supply is approximately equal to its input voltage. MOSFET 7' can be controlled in the same manner as it is with reference to FIG. 1B or it can merely be switched on only when either MOSFET 6' or MOSFET 8' are also switched on. The reason for this is that in the embodiments of FIGS. 1A and 1C, MOSFET 17 supplies additional current through the filter 14, 15, 16 during the time the MOSFETs 5–8 are not conducting (in the case of FIG. 1A) or during the time MOSFETs 6' and 8' are not conducting (in the case of FIG. 1C). This function of MOSFET 17 is generally handled by MOSFET 7' in the embodiment of FIGURE 1B; however, instead of supplying the extra current at the outputs of diodes 11 and 12 as is done in the case of FIGS. 1A and 1C, the extra current is supplied via the autotransformer 9 in the embodiment of FIG. 1B.

The winding ratio of the autotransformer 9 is again preferably 1:1:1:1, but these ratios can, of course, be varied.

Figure 1D:
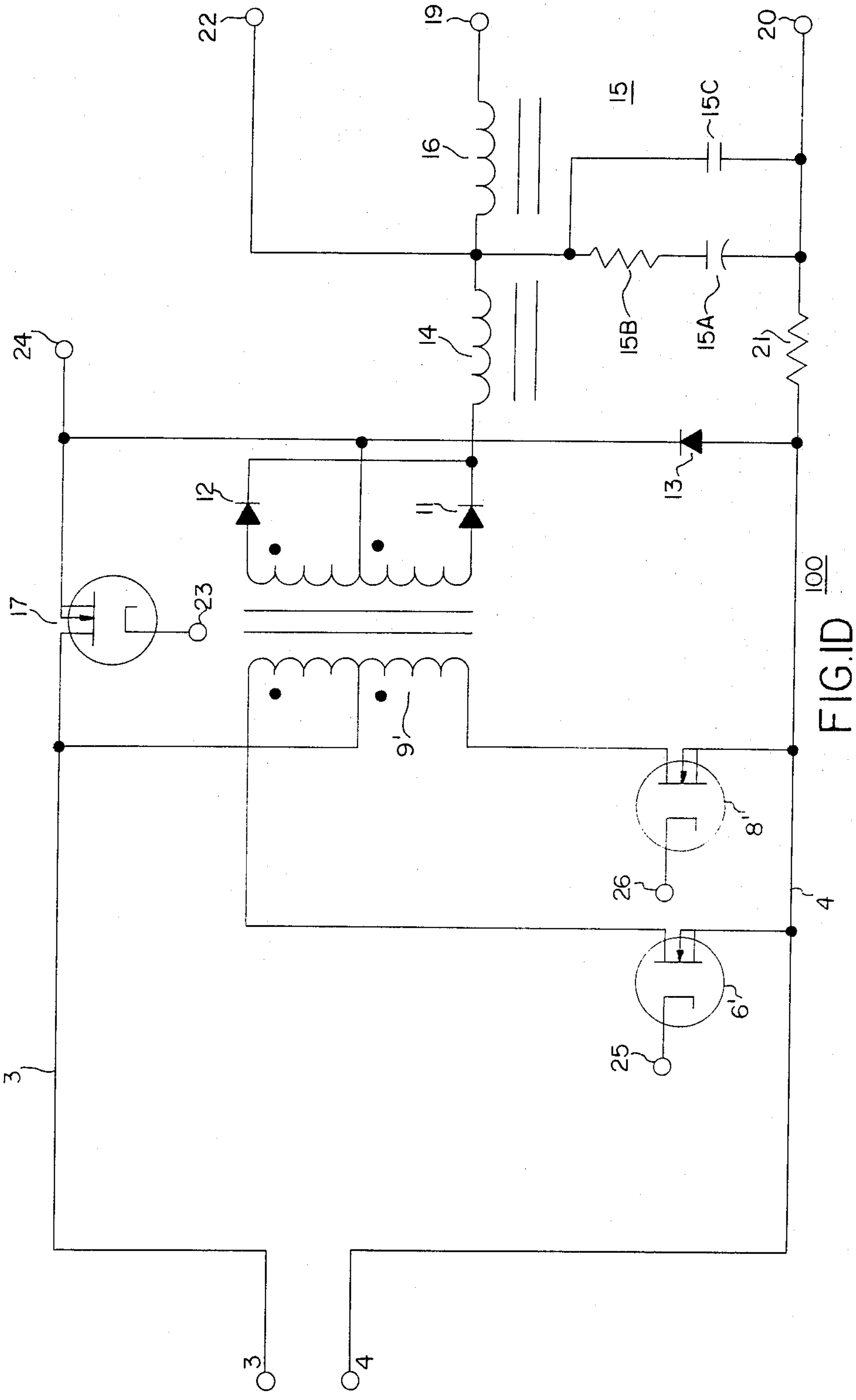
FIG. 1D is a circuit diagram of a fourth embodiment of a DC to DC converter device.

FIG. 1D is a schematic diagram of a fourth embodiment of the DC to DC converter 100. In this embodiment, MOSFETs 6' and 8' operate in push/pull fashion, but instead of using an autotransformer 9, a transformer 9' with isolated secondary is employed. MOSFETs 6' and 8' are connected to the primary winding which has a center tap connected to the supply bus 4. The secondary of transformer 9' is coupled via diodes 11 and 12 to filter 14, 15, 16. A center tap on the secondary side of transformer 9' is coupled to the return of bus 4 via a diode 13 and is also coupled to MOSFET 17. Again, MOSFET 17 is gated on whenever the output voltage exceeds the supply voltage and MOSFETs 6' and 8' are controlled by the pulse width modulation control circuit of FIG. 2A.

In operation, a voltage is induced in the secondary of transformer 9' which is higher than the input voltage which is applied through MOSFET 17. As in the case of the previously described embodiments, MOSFET 17 is turned off to allow the output voltage of the supply to decrease below its input voltage, when required. When MOSFET 17 is turned off, diode 13 connects the secondary center tap to return bus 4 allowing energy to flow in the secondary.

A possible variation of this embodiment would be to pulse width modulate MOSFET 17 at twice the rate of MOSFETs 6' and 8' to cause the output voltage to drop below the input voltage.

As those skilled in the art would appreciate, the turns ratio of the transformer determines the maximum output voltage. We prefer to use a transformer with turns ratio of 1:1.8 (primary to secondary).

Figure 1E:
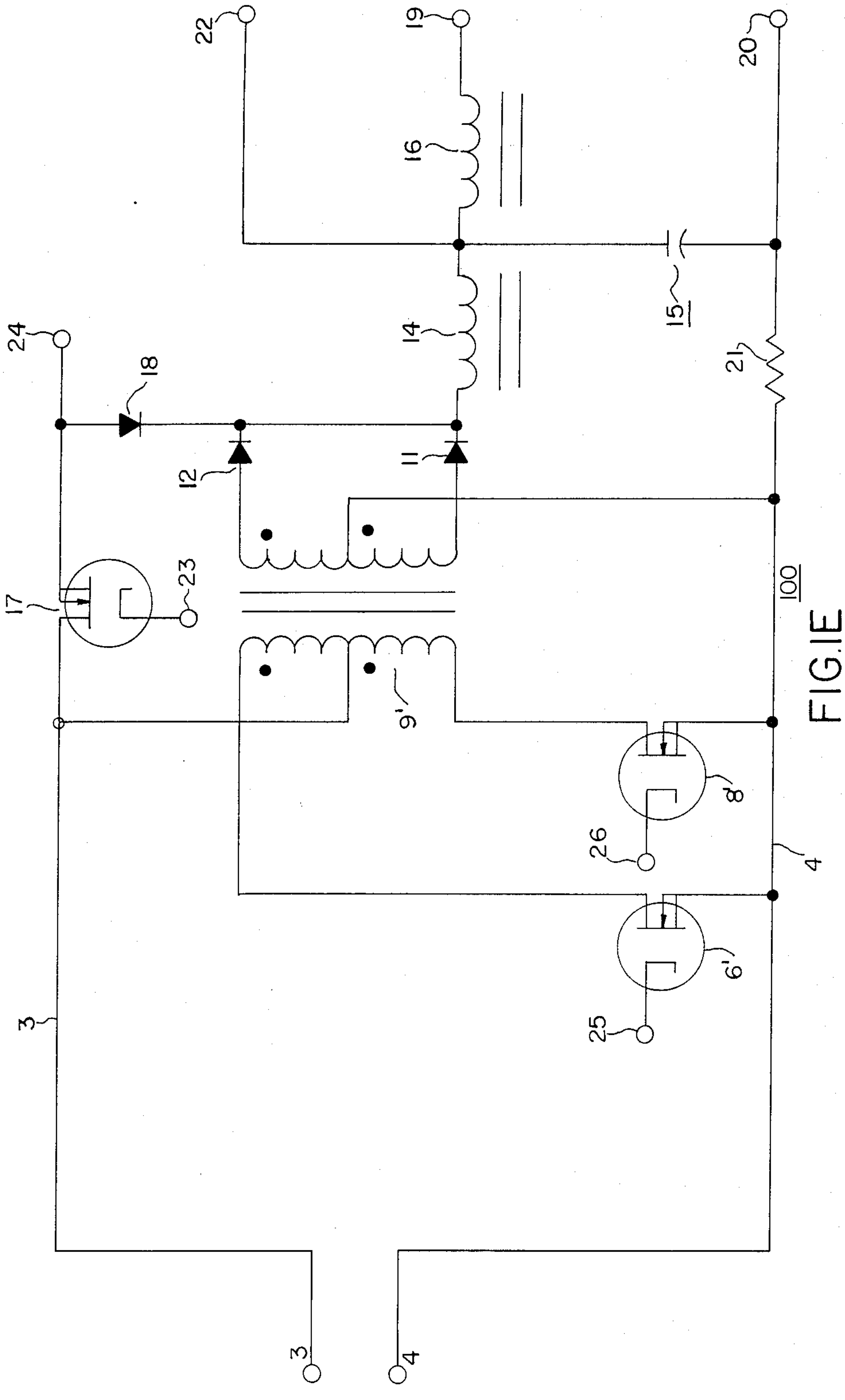
FIG. 1E is a circuit diagram of a fifth embodiment of a DC to DC converter device.

FIG. 1E depicts a schematic diagram of a fifth embodiment of the DC to DC converter 100. This embodiment is quite similar to the fourth embodiment, except that the MOSFET 17 is coupled via diode 18 to the outputs of commonly connected diodes 11 and 12 as opposed to being coupled at the center tap of the secondary of transformer 9'. As in the case of the preceding push/pull embodiments, MOSFET 6' and 8' are pulse width modulated to control the output voltage and current. MOSFET 17 is switched on during normal hot lamp operation, that is, when the output voltage of the power supply exceeds the input voltage. When the output voltage needs to be lower than the input voltage, MOSFET 17 is switched off. The winding ratio of transformer 9' is preferably at least 1:2.

Figure 1F:
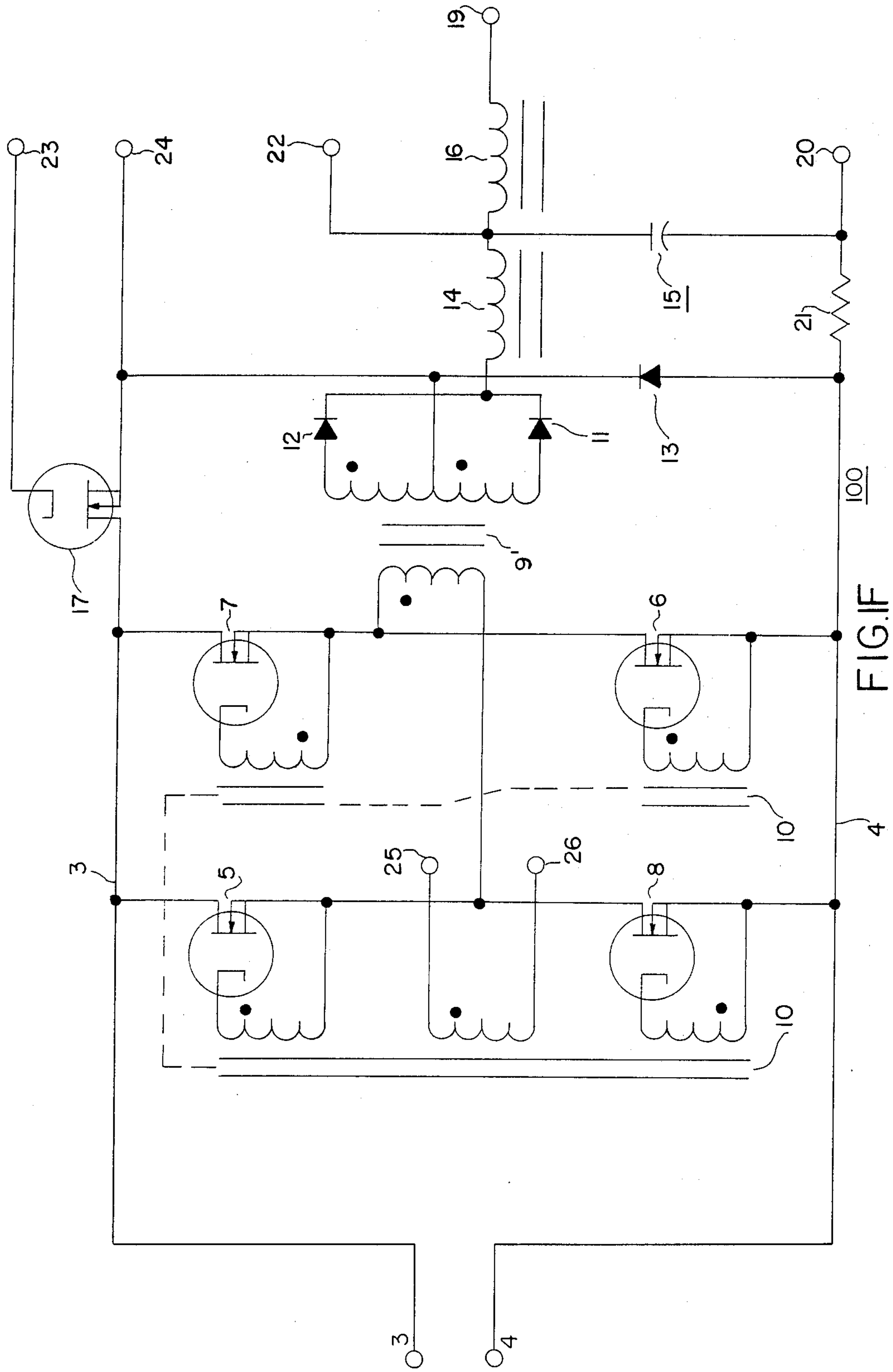
FIG. 1F is a circuit diagram of a sixth embodiment of a DC to DC converter device.

FIG. 1F depicts a sixth and presently preferred embodiment of the DC to DC converter 100 which is similar to the embodiment of FIG. 1A in that a full bridge series of MOSFETs 5–8 are used at the input to transformer 9', but transformer 9' in lieu of being an autotransformer has an isolated secondary similar to the embodiments of FIGS. 1D and 1E. By using the full bridge arrangement of MOSFETs, this avoids the necessity for a center tap on the primary of transformer 9'. The winding ratio is preferably 1:1.8.

Figure 1G:
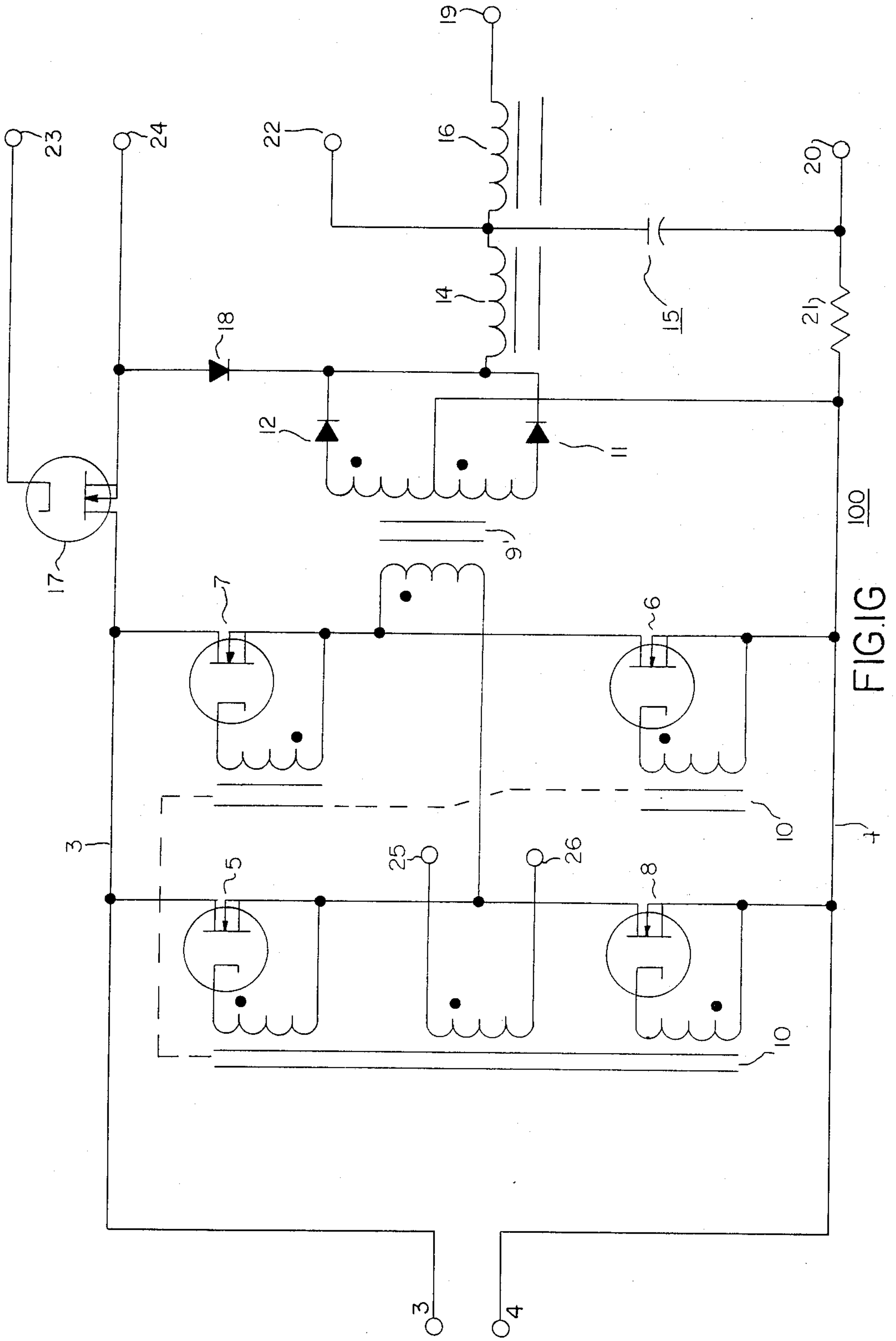
FIG. 1G is a circuit diagram of a seventh embodiment of a DC to DC converter device.

FIG. 1G depicts yet another embodiment of the DC to DC converter 100, which is generally similar to the embodiment of FIG. 1F, up to the input of transformer 9'; but the output of the transformer 9' and the connection of MOSFET 17 is made similar to the embodiment of FIG. 1E. The winding ratio is preferably 1:2 or greater.

2. Embodiments of the Gate Drive Control Circuit

Figure 2A:
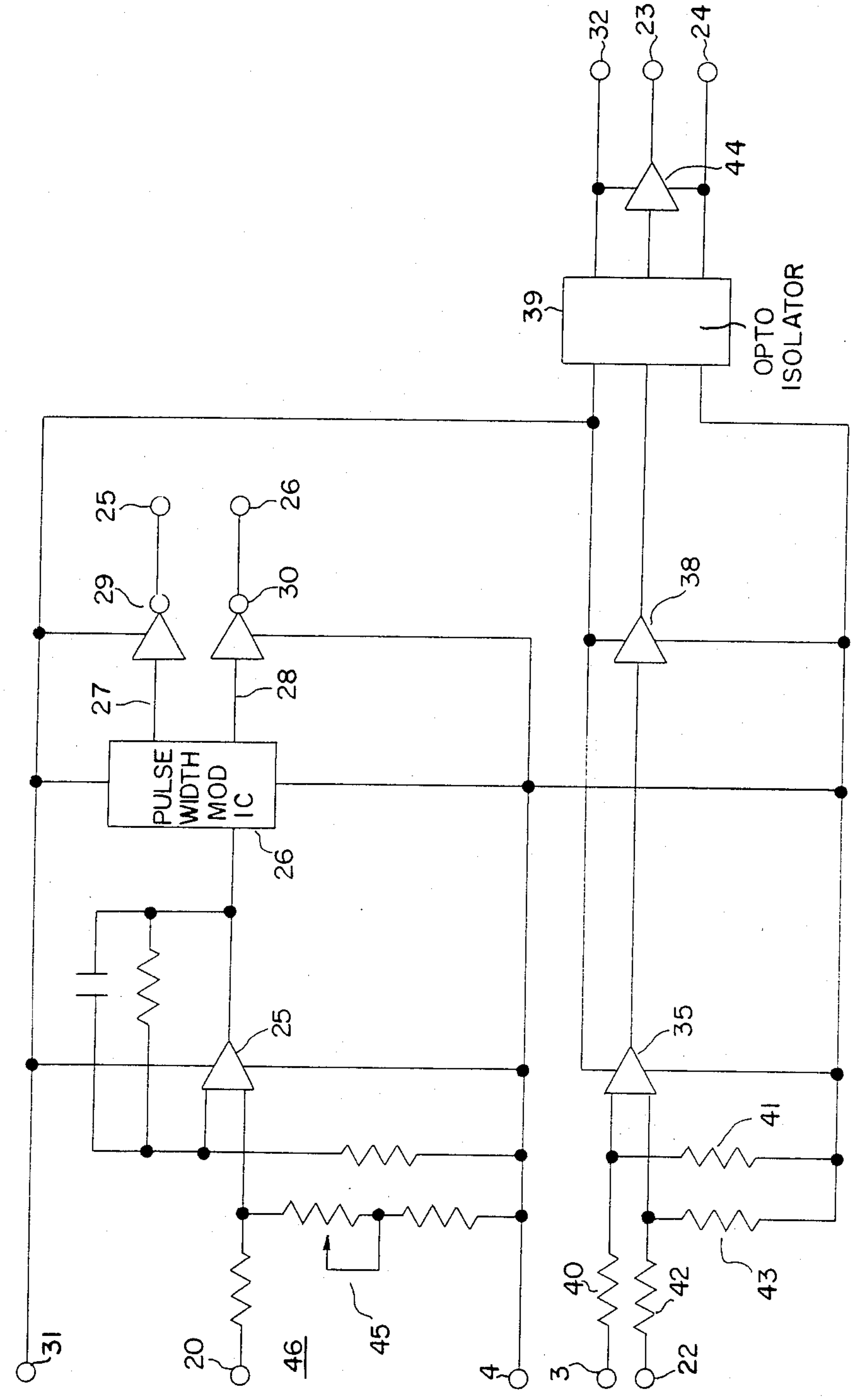
FIG. 2A is a circuit schematic of the gate drive control circuit for the DC to DC converter of FIGS. 1A through 1G.

FIG. 2A is a schematic diagram of an embodiment of the gate drive control circuit. This circuit is preferably powered via supply lines 31 and 32 with stabilized D.C. voltage sources which are isolated from each other and from the main power circuits. Indeed, a power supply having preferably four isolated 15 Volt D.C. outputs is connected as follows: One output is connected at lines 3 & 4: a second output is connected at lines 31 & 4; a third output is connected at lines 32 & 24; and the fourth output is connected at lines 64 & 20 (see FIGS. 3 & 4).

An amplifier Integrated Circuit (IC) 25 receives a portion of the voltage drop generated across current sensing resistor 21 (FIGS. 1A through 1G), and amplifies it. The portion received is controlled and adjusted by a voltage divider 46 which includes a pot 45. The output of IC 25 is applied to a pulse width modulating IC 26, the outputs 27, 28 of which are inverted and buffered by buffer ICs 29 and 30. The outputs of buffer ICs 29, 30 drive the primary winding of gate drive transformer 10 for the embodiments of FIG. 1A, 1F and 1G. The outputs of buffer ICs 29 and 30 drive the MOSFETs 6' and 8' directly in the embodiments of FIGS. 1B–1E. In either case the current supplied by the power supply is controlled by changing the period of time the pairs of MOSFETs 5 & 6 and 7 & 8 (in FIGS. 1A, 1F and 1G) or the MOSFETs 6' and 8' (in the other figures) are on, i.e., by changing the width of the pulses provided by the gate drive circuitry to the gates of the MOSFETs.

The preferred type numbers (model numbers) and manufacturers of ICs 25 & 26, and indeed of all the major ICs used in the disclosed power supply are listed in Table I.

The voltage on bus 3, 4 which is the input voltage to the DC to DC converter 100, is applied via a voltage divider formed by resistors 40, 41 to one input of a comparator IC 35. The divider supplies a portion of the voltage on line 3 to IC 35, the portion being within the normal input range of comparator IC 35. Similarly, the voltage provided by the DC to DC converter 100 at node 22 is divided by resistors 42, 43 and applied to the other input of IC 35. The state of the comparator IC then indicates whether the input voltage is higher or lower than the output voltage of the DC to DC converter 100. The output of comparator IC 35 is applied via a buffer IC 38 to an optologic isolator IC 39. The output of the isolator IC 39 is amplified by a buffer IC 44 and applied to the gate 24 and source 23 of MOSFET transistor 17 (FIGS. 1A and 1C–1G) so that it is turned on or off in response to the comparative levels of the input and output voltage of the power supply. As previously discussed, MOSFET 17 is gated on when the output voltage of the DC to DC converter 100 is greater than its input voltage and off when the output voltage is less than the input voltage.

Figure 2B:
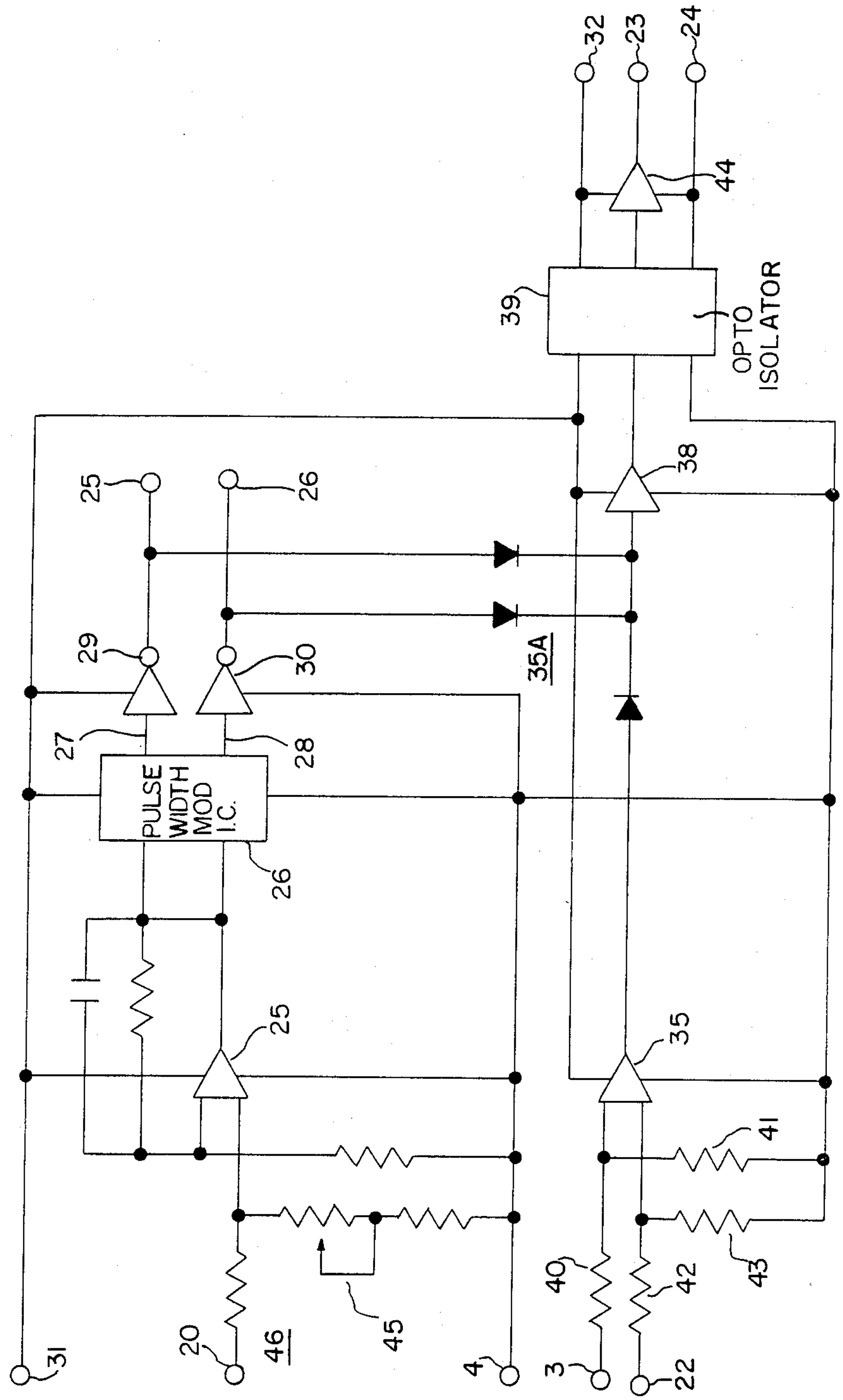
FIG. 2B shows modifications to the gate drive control circuitry of FIG. 2A, which modifications are used with the DC to DC converter embodiment of FIG. 1B.

FIG. 2B depicts another embodiment of the gate drive control circuit. This embodiment is similar to the embodiment of FIG. 2A, but in this case the output from the optologic isolator IC 39 is controlled not only by the results of the comparison done at IC 35, but is also controlled according to the state of buffer ICs 29 and 30. This embodiment may be used in connection with the second embodiment of the DC to DC converter 100 shown in FIG. 1B to control the states of MOSFETs 6', 7' and 8'. For example, and with respect to FIG. 1B, it will be recalled that MOSFET 7' is turned on whenever either MOSFET 6' or MOSFET 8' is turned on. This function is accomplished by the connections from buffer ICs 29 and 30 through OR summing junction 35A to invertor 38. Also, MOSFET 7' in FIG. 1B is also turned on when the output voltage exceeds the input voltage of the power supply and this function is controlled by the state of comparator IC 35 as it, too, is connected via OR gate 35A to buffer 38.

Figure 2C:
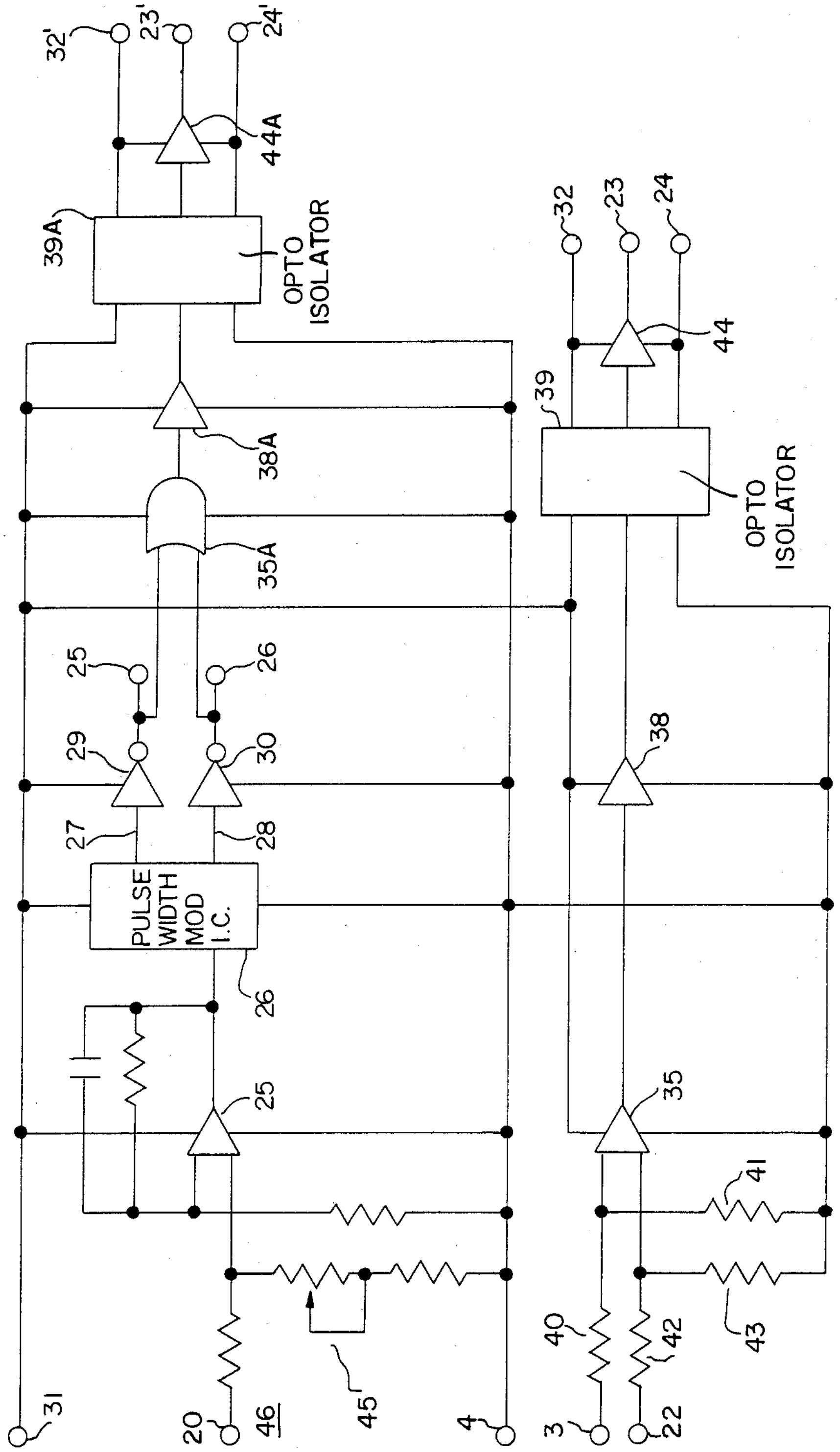

With respect to the embodiment of FIG. 2C, this circuit is also similar to the embodiment of FIG. 2A. This control circuit can be used to control MOSFETs 6', 7', 8' and 17 of FIG. 1C. Naturally, MOSFET 7' in FIG. 1C must be switched on whenever MOSFETs 6' or 8' are on, and this is accomplished through the action of OR gate 35A (the OR summing junction 35A of FIG. 2B and the OR gate 35A of FIG. 2C can be used interchangably). The output of OR gate 35A is connected via an invertor 38A, an optologic IC 39A and a buffer IC 44A to node 23' (which controls the gate of MOSFET 7'). Otherwise, the circuit of FIG. 2C is the same as the circuit of FIG. 2A.

4. The DC to AC CONVERTER

Figure 3:
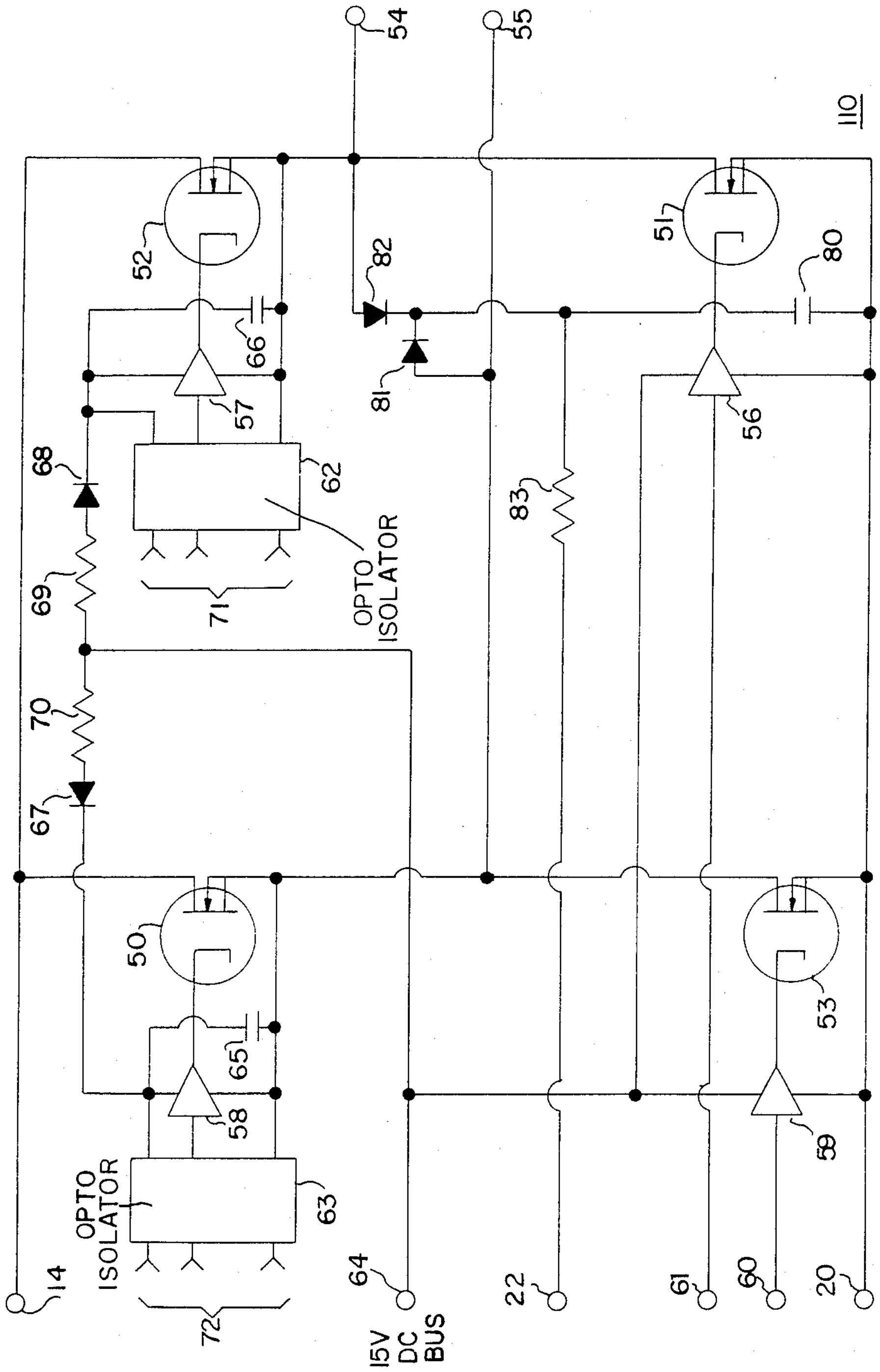
FIG. 3 is a circuit schematic of an "H" bridge which is connected to the output of the converters of FIGS. 1A through 1G.

The schematic diagram of DC to AC converter 110 is shown in FIG. 3. MOSFET transistor switches 50, 51, 52 and 53 are arranged as an "H" bridge and are alternately turned on and off in pairs so that the DC voltage on bus 3, 4 is caused to flow in alternating directions through the lamp head 95 (FIG. 5). MOSFETs 50 and 51 cause the lamp current to flow in one direction and MOSFETs 52 and 53 cause it to flow in the other direction during ignition. The gates of the MOSFETs are driven by buffer ICs 56, 57, 58 and 59. Buffer ICs 56 and 59, which drive the lower MOSFETs 51, 53 in the "H" bridge, are driven alternatingly at nodes 60, 61 directly from a bridge control circuit which will subsequently be described with reference to FIG. 4. The buffer ICs 57, 58 for the upper MOSFETs 52, 50 are driven by optologic isolators ICs 62 and 63. The bias power for buffer ICs 57 and 58 and the output side of the optologic isolator ICs 62 and 63 is preferably derived from the fourth output of the aforementioned power supply at node 64. This bias power is stored in capacitors 65 and 66 which are charged through diodes 67 and 68 and current limiting resistors 69 and 70. This charging action occurs when the corresponding lower MOSFET is switched on. The optologic amplifier devices 62, 63 are alternatingly driven by the "H" bridge control circuit of FIG. 4.

An output clamping circuit is connected across terminals 54 and 55. It includes a capacitor 80, diodes 81 and 82 and a bleeder resistor 83. This clamp circuit protects MOSFETs 50–53 from voltage transients and spikes which can and will occur at terminals 54 and 55. Such spikes arise from the fact the arc lamp 96 typically is installed in a head 95 (FIG. 5) which has inductive components therein which generate voltage spikes when driven with a squarewave. A positive going spike is shunted to capacitor 80 by diode 81 or 82. The charge on capacitor 80 is maintained by coupling capacitor 80 to capacitor 15 (FIG. 1A–1G) via node 22 and resistor 83. Positive going spikes will charge capacitor 80 to a higher potential than that which normally exists on capacitor 15, but resistor 83 will discharge the difference before the next spike occurs.

4. The "H" Bridge Control Circuit

Figure 4:
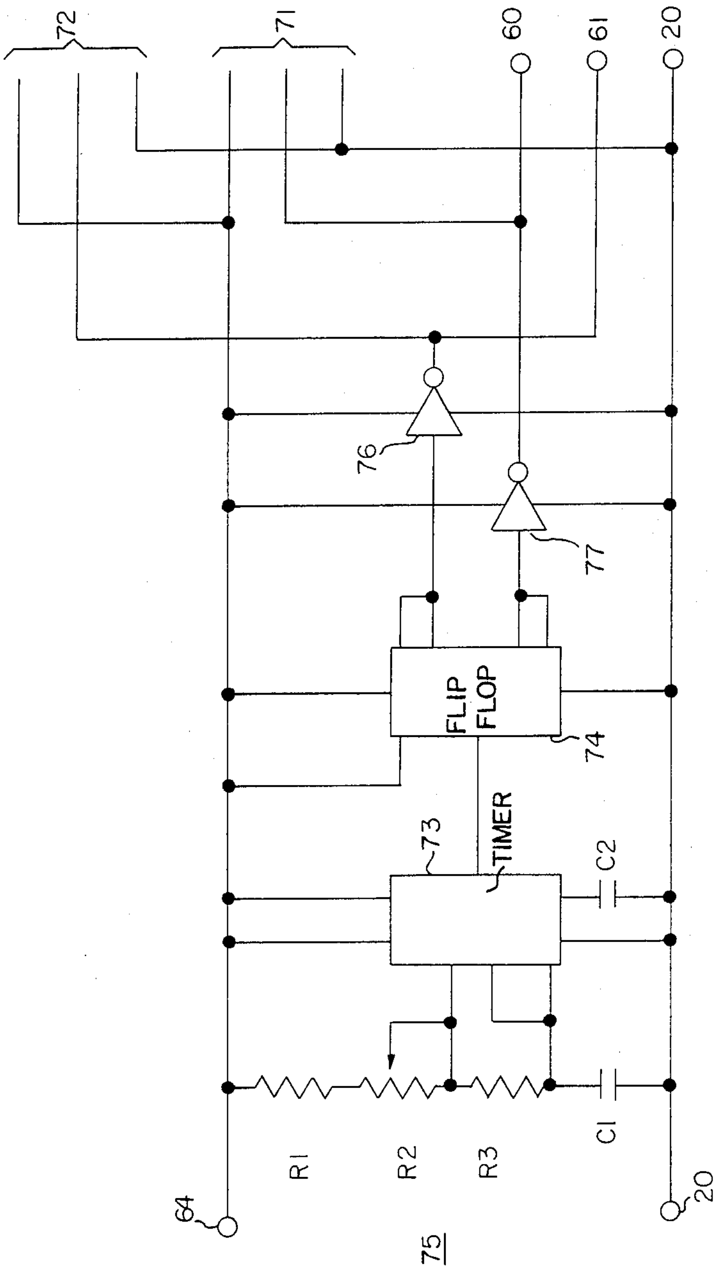
FIG. 4 is a circuit schematic of an embodiment of the control circuit for the "H" bridge circuit of FIG. 3.
Figure 5:
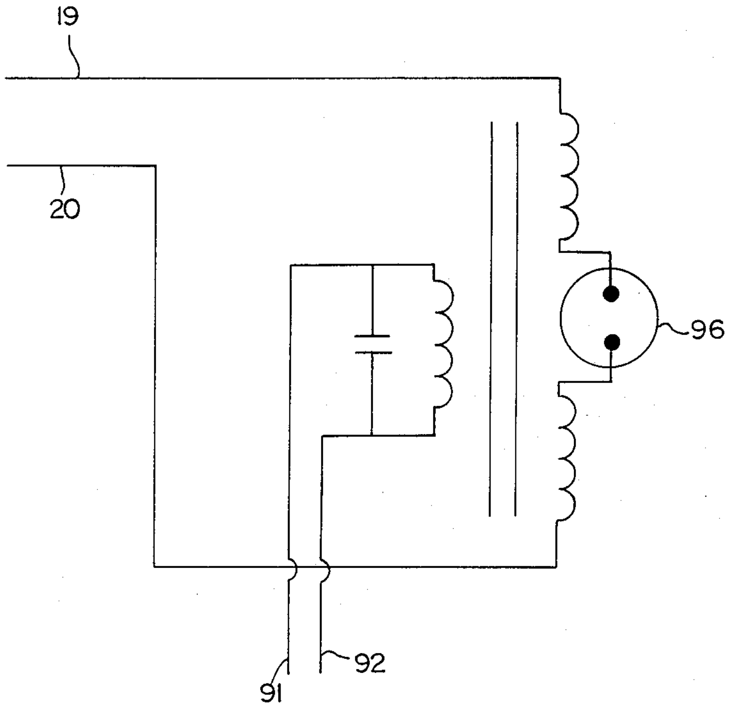
FIG. 5 is a schematic diagram of an arc lamp head.

Turning now to FIG. 4, which is a schematic diagram of the control circuit for the "H" bridge of FIG. 3, this control circuit has a timer IC 73 which drives a flip-flop IC 74. The frequency outputted by IC 73, nominally 60 Hz, is set by resistors and capacitor arrangement 75. The outputs of IC 74 are connected to inverting buffer ICs 76 and 77. These outputs and power supply lines 64, 20 are coupled to the optologic isolators ICs 62 and 63 of FIG. 3 via control busses 71 and 72. Thus, the outputs of the inverting buffer ICs 76, 77 drive the various inputs of the "H" bridge circuit, that is, the inputs of buffer ICs 56 and 59 and the inputs of optologic amplifier ICs 62 and 63 (FIG. 3)

The output applied to the lamp at terminals 54, 55 is therefore 60 Hz squarewave. Since the turn off times of the MOSFETS 50–53 is longer than there turn on times, the output at terminals 54, 55 momentarily shorts at each transition. This shorting can help to reduce voltage spikes which are generated when the current is quickly switched in an inductive load such as head 95. Spikes which still occur are handled by the previously described clamp circuit. The maximum positive and negative voltage of the squarewave is equal to the voltage on bus 17, 18 (less the voltage drops across the conducting MOSFET switches 50, 51 or 52, 53).

5. Operation

Assuming that the power supply is connected to a 120 volt source (either AC or DC) and to an arc lamp head 95 such as that depicted in FIG. 5, the voltage which must be generated to efficiently ignite the arc lamp 96 is on the order of 230 volts. At this point, MOSFETs 5–8 or MOSFETs 6′ and 8′ as the case may be, will be oscillating and MOSFET 17 (MOSFET 7′ in the case of FIG. 1B) will be gated on to pump additional power into the lamp. At the same time switch 90 is closed and therefore additional power in the form of an AC current is being pumped into the head 95 by the DC to AC converter (preferably implemented by the "H" bridge circuitry). To ignite the lamp, switch 90 is momentarily closed and after ignition the output voltage of the DC to DC converter 100 will drop to approximately 30 volts, causing MOSFET 17 to turn off (and cause MOSFET 7′ in the case of FIG. 1B to switch on and off n time with MOSFETs 6′ and 8′.) The output voltage from the power supply will rise to approximately 120 volts. As the output voltage of the power supply exceeds its input voltage, MOSFET 17 (MOSFET 7′ in the case of FIG. 1B) is again turned on by its gate control circuit and MOSFET 17 (MOSFET 7′, FIG. 1B) will then again supply additional power to the arc lamp. The voltage will continue to rise to a steady state condition where the output voltage is approximately 210 volts.

If the arc lamp 91 is de-energized or becomes extinguished, and while it is still physically hot (i.e. it only was recently de-energized or extinguished), the arc lamp 96 can be brought back to full power (and therefore full intensity light) in approximately ten seconds. In approximately ten seconds, capacitor arrangement 15 is recharged to the maximum voltage available from the power supply, which will likely be 235 volts or greater. At the same time, MOSFET 17 is on, thereby permitting the power supply to supply the necessary surge of current to re-ignite the arc lamp which occurs when the ignition switch 90 is briefly closed and thereby connecting the voltage on bus 91, 92 to an ignition coil in head 95. The charge stored in capacitor 15 is dumped very quickly into the lamp, helping it to re-ignite. Since the inductance of inductor 16 is relatively small, it offers little impedance to the surge of current provided by capacitor 15.

The semiconductor devices used in the Figures include both CMOS and TTL type devices and therefore those skilled in the art will appreciated that appropriate level shifting devices will also have to be employed. Alternatively, the devices can be changed to use, for example, exclusively CMOS or TTL devices.

The invention has been described in connection with a number of embodiments and certain modifications have been mentioned. Further modifications will become apparent to those skilled in the art. Therefore, the invention is not intended to be limited to the disclosed embodiments, except as required by the appended claims.

TABLE I

PREFERRED INTEGRATED CIRCUIT DEVICES

| Item Number(s) | Part Number | Description | Manufacturer |
|---|---|---|---|
| 25 | LM358 | Dual Differential Input Operational Amplifier | Motorola |
| 26 | SG3525 | Pulse Width Modulator | Motorola |
| 29, 30, 38, 38A, 56, 57, 58, 59, 76, 77 | CD4049 | CMOS Hex Invertor | RCA |
| 35 | LM339 | Quad Comparator | Motorola |
| 35A | CD4075B | OR Gate | RCA |
| 39, 39A, 62, 63 | 740L6010 | Optologic Opto-coupler | General Instrument |
| 44, 44A | CD4050 | CMOS Hex Buffer | RCA |
| 73 | 555 | Timer | National Semiconductor |
| 74 | 74C73 | Flip Flop | National Semiconductor |

What is claimed is:

1. A power supply for an arc lamp, comprising:

a DC to DC converter having an input, an output, means for increasing the voltage received at the input and for supplying the increased voltage to said output; current sensing means for controlling the amount of current delivered to said output; an electronic switch coupling said input and said output; and switch control means responsive to the voltage of said input and at said output for controlling the state of said electronic switch depending upon the relative voltage levels of said input and output.

2. The power supply of claim 1 wherein said voltage increasing means includes a transistor bridge coupled to said input, a transformer connected to said transistor bridge and control electrode drive circuitry for controlling the width of control pulses applied to control electrodes of said transistor bridge.

3. The power supply of claim 2 wherein said control electrode drive circuitry is responsive to the amount of current supplied by said output for controlling the period of time transistors in said transistor bridge are on in response thereto.

4. The power supply of claim 3 wherein said electronic switch includes a transistor switch and a diode coupled in series with the input and the output.

5. The power supply of claim 4 wherein said switch control means includes means for comparing the input and output voltages of said converter.

6. The power supply of claim 5 wherein said control circuit gates said transistor switch on when the output voltage is greater than said input voltage.

7. The power supply of claim 1, further including means for re-igniting the arc lamp quickly after the lamp has become de-energized, said re-igniting means including a capacitor coupled to said output and means for charging said capacitor to a voltage higher than the normal operating voltage of said arc lamp.

8. The power supply of claim 7, further including an output filter connected to said output of said DC to DC converter, said filter including a pair of inductors and a capacitor, the capacitor of said output filter and the capacitor of said re-igniting means being the same capacitor.

9. The power supply of claim 8, wherein one of said pair of inductors is connected in series between said capacitor and said arc lamp, the inductance of said one of said pair of inductors being at least twice the inductance of the other of said pair of inductors.

10. The power supply of claim 1, wherein the DC to DC converter includes a filter having a capacitor and an inductor, the size of the capacitor being relatively large compared to the size of the inductor, whereby upon reignition of the lamp, the inductor is sized such as to not unduly impede the transfer of the charge then stored in the capacitor into the lamp.

11. A power supply for an arc lamp, comprising:

(a) a DC converter having an input, an output, means for increasing the voltage received at the input and for supplying the increased voltage to its output, and current sensing means for controlling the amount of current delivered to said output, said voltage increasing means including a transistor bridge coupled to said input transformer connected to said transistor bridge, control electrode drive circuitry for controlling the width of control pulses applied to control electrodes of said transistor bridge, and another transistor and a diode coupled in series with the input and the output; and (b) an output "H" bridge coupled to the output of the DC converter for generating a square wave in response thereto.

12. A power supply for an arc lamp, comprising:

(a) a DC converter having an input, an output, four electronic switches arranged in a bridge configuration, a transformer coupled to said electronic switches, a gate drive control circuit for controlling said electronic switches, said gate drive control circuitry alternating turning on opposing pairs of said electronic switches in said bridge configuration so as to reverse the direction of current flow through said transformer, rectifying means connected to said transformer and to said output of said DC converter, another electronic switch coupling the input of said DC converter to the output of said transformer and gate control means for controlling said another electronic switch so as to turn said another electronic switch on when the output voltage of said converter is greater than its input voltage; and (b) an output bridge coupled to the output of the DC converter for generating a square wave in response thereto.

13. A DC converter having an input, an output, a transformer, a plurality of electronic switching devices connected to the input of said converter and arranged so as to alternatingly reverse the direction of current flow through said transformer, rectifier means connected at an output of said transformer, filter means coupling said rectifiers to the output of said power supply and another electronic switch, means coupling said another electronic switch to the input of said power supply and to the output of said power supply and control means for controlling the state of said another electronic switch, said control means including means for comparing the input and output voltages of said power supply.

14. A power supply for a high intensity lamp, comprising:

a DC converter having an input, an output, a transformer, a plurality of electronic switches coupled to the input of said converter and to an input of said transformer, said electronic switches being arranged so as to alternatingly reverse the direction of current flow through said transformer, rectifying means coupling an output of said transformer to said output of said DC converter and another electronic switch arranged to couple the output of said DC converter to the output thereof.

15. The power supply of claim 14, wherein said plurality of electronic switches are arranged in a bridge configuration.

16. The power supply of claim 15, wherein said transformer is an auto transformer.

17. The power supply of claim 15, wherein said transformer has an isolated secondary, the input of said transformer being formed by a primary winding and the output of the transformer being formed by said isolated secondary.

18. The power supply of claim 14, wherein said plurality of electronic switches is arranged in a push-pull configuration.

19. The power supply of claim 18, wherein said transformer is an autotransformer.

20. The power supply of claim 18, wherein said transformer has an isolated secondary, the input of said transformer being formed by a primary winding and the output of the transformer being formed by said isolated secondary.

21. The power supply of claim 20, wherein the primary and secondary of said transformer includes center taps, and wherein said another electronic switch is connected to the center taps of the primary and secondary of said transformer.

* * * * *